United States Patent
Crafts

(10) Patent No.: US 6,628,865 B2
(45) Date of Patent: Sep. 30, 2003

(54) ALIGNMENT OF OPTICAL FIBERS TO AN ETCHED ARRAY WAVEGUIDE

(75) Inventor: Douglas E. Crafts, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 09/738,800

(22) Filed: Dec. 15, 2000

(65) Prior Publication Data

US 2002/0076162 A1 Jun. 20, 2002

(51) Int. Cl.⁷ .................................................. G02B 6/30
(52) U.S. Cl. ......................................................... 385/49
(58) Field of Search ..................................... 385/49, 39

(56) References Cited

U.S. PATENT DOCUMENTS

| | | | |
|---|---|---|---|
| 4,973,127 A | 11/1990 | Cannon et al. | |
| 4,983,012 A | 1/1991 | Saito et al. | |
| 5,037,179 A | 8/1991 | Bortolin | |
| 5,574,811 A | * 11/1996 | Bricheno et al. | 385/52 |
| 5,611,010 A | 3/1997 | Shiino et al. | |
| 5,613,024 A | * 3/1997 | Shahid | 385/50 |
| 5,619,605 A | 4/1997 | Ueda et al. | |
| 5,625,730 A | 4/1997 | Ishikawa et al. | |
| 5,633,968 A | 5/1997 | Sheem | |
| 5,689,599 A | 11/1997 | Shahid | |
| 5,721,798 A | 2/1998 | Kanda | |
| 5,818,994 A | 10/1998 | Hehmann | |
| 6,160,936 A | 12/2000 | You et al. | |
| 6,181,855 B1 | 1/2001 | Richter et al. | |
| 6,240,235 B1 | * 5/2001 | Uno et al. | 385/137 |
| 6,241,399 B1 | * 6/2001 | Nobuhara | 385/84 |
| 6,243,518 B1 | 6/2001 | Lee et al. | |
| 6,394,663 B2 | * 5/2002 | Nakagawa et al. | 385/84 |

FOREIGN PATENT DOCUMENTS

| | | |
|---|---|---|
| EP | 0-667-543 A1 | 8/1995 |
| JP | 60-158410 | 12/1985 |
| JP | 01-142508 | 6/1989 |
| JP | 02-156211 A | 6/1990 |
| JP | 09-230168 A | 9/1998 |
| JP | 10-206685 | 11/1998 |

* cited by examiner

*Primary Examiner*—Javaid Nasri
(74) *Attorney, Agent, or Firm*—Charles K. Young

(57) ABSTRACT

A device and method of aligning two or more optical fibers on an array waveguide is achieved by etching grooves into the array waveguide. The two or more optical fibers are attached together by a retainer and placed into the grooves of the array waveguide. Channels within the array waveguide are coursely aligned to the two or more optical fibers and may be more finely aligned by manual adjustment.

19 Claims, 7 Drawing Sheets

ALIGNMENT OF OPTICAL FIBERS TO AN ETCHED ARRAY WAVEGUIDE

BACKGROUND OF THE INVENTION

1. Field of the Invention

The described invention relates to the field of optics. In particular, the invention relates to coupling a fiber optic bundle to a planar photonic structure, such as an array waveguide ("AWG").

2. Description of Related Art

Fiber optic bundles and AWGs are both used for propagating light. A fiber optic bundle has multiple optical fibers for propagating light, and an AWG has multiple channels for propagating light within. Coupling a fiber optic bundle to an AWG, however, is not easy. Manual alignment requires detecting and maximizing light connectivity between the fiber optic bundle and the AWG. Once a good connection is obtained, permanently fixing the alignment is required.

FIG. 1A shows a prior art fiber optic bundle 10. The fiber optic bundle 10 comprises multiple optical fibers 12 sandwiched between two retainers 16 and 18. The retainers are substrates made of silicon, for example, that are appropriately masked with a suitable etch mask. Thereafter, symmetrically spaced unmasked areas of the substrate are exposed to a chosen anisotropic etchant, such as hot KOH or ethylenediamine. This etchant preferentially attacks a chosen (100) crystallographic plane of the silicon substrate and preferentially etches in a vertical direction until V-shaped grooves ("V-grooves") are attained. Upon completion of these V-shaped grooves, optical fibers are placed in the grooves and come to rest in alignment with the center of the V-grooves between the retainers 16 and 18.

FIG. 1B shows a prior art single retainer without the optical fibers. The two retainers 16 and 18 sandwich the optical fibers together as a termination block for the fiber optic bundle. The termination block maintains the spacing between the optical fibers and allows for easily handling the fiber optic bundle. The ends of the optical fibers 22 are typically polished after being set in the termination block.

FIG. 2 shows a prior art example of an AWG. The AWG comprises multiple channels 30 running through the AWG. The AWG may comprise a glass, silicon, oxide or polymer substrate. The channels are made of materials having a slightly higher index of refraction than the rest of the AWG. AWGs and fiber optic bundles may be made with various numbers of channels.

FIG. 3 shows a side view of a fiber optic bundle being aligned to an AWG 42. The optical fibers of the fiber optic bundle and the channels of the AWG have identical spacings and number. A dotted line 45 shows the channels in the AWG. An epoxy 50 is used to hold the termination block 40 of the fiber optic bundle to the AWG 42, but alignment must be maintained. It is difficult to achieve alignment, i.e., photonically couple the optical fibers to the AWG channels, and then to epoxy without losing alignment.

DETAILED DESCRIPTION

There are several ways of improving alignment between a fiber optic bundle and an AWG. In some cases, quick course alignment is followed up with finely aligning the fiber optic bundle and AWG afterwards.

Figure 4:
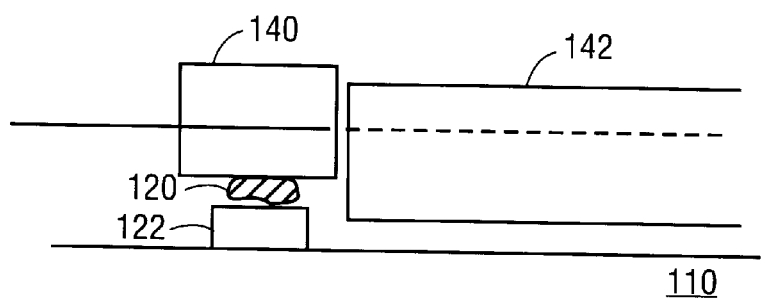
FIG. 4 shows a first embodiment for aligning a fiber optic bundle to an AWG.

FIG. 4 shows a first embodiment for aligning a fiber optic bundle to an AWG. In this embodiment, the AWG 142 is mounted to a base 110. The fiber optic bundle's termination head 140 is also mounted to the base 110 via a high viscosity epoxy 120. In one embodiment, a spacer 122 attached to the base 110 may be used to reduce the thickness of epoxy 120 employed.

Figure 1A:
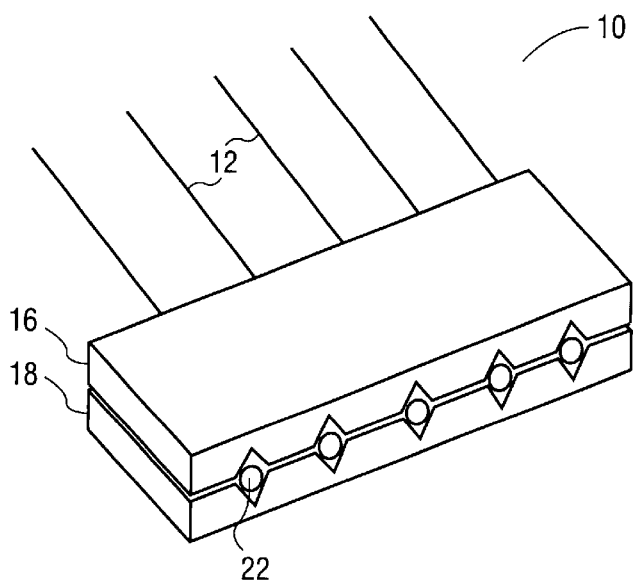
FIG. 1A shows a prior art fiber optic bundle
Figure 1B:
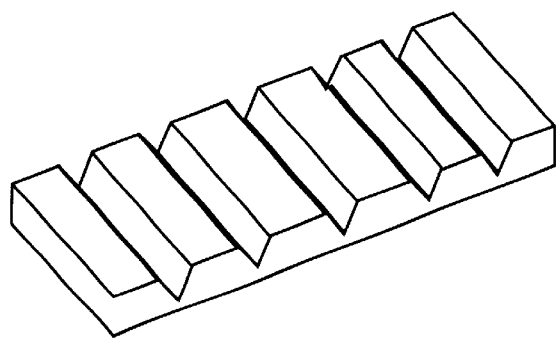
FIG. 1B shows a prior art single retainer without the optical fibers.
Figure 2:
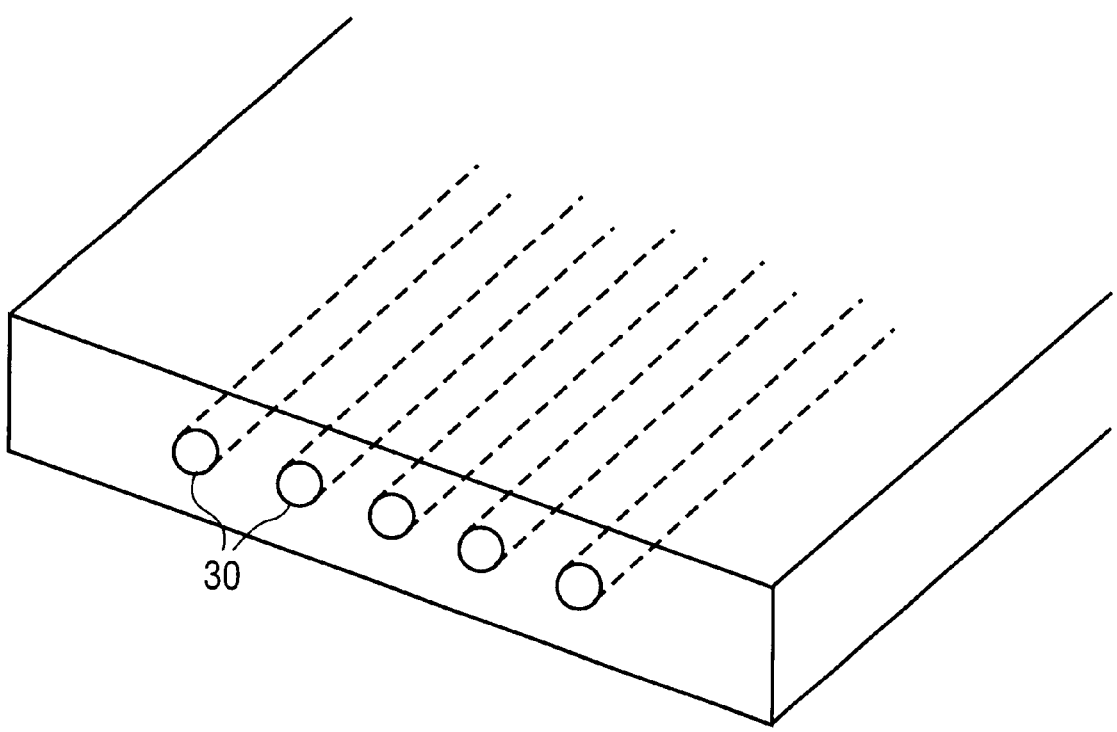
FIG. 2 shows a prior art example of an AWG.
Figure 3:
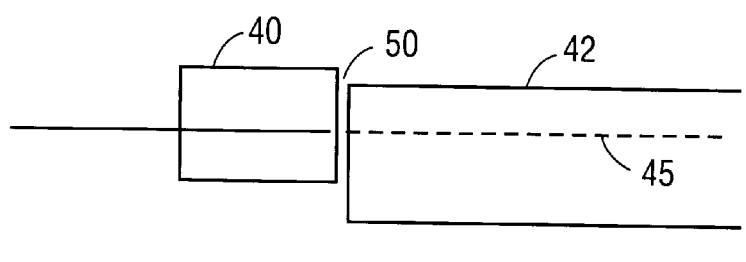
FIG. 3 shows a side view of a fiber optic bundle being aligned to an AWG.

Typical epoxies such as that used in prior art FIG. 3 shrink when cured. This post-bond shrinkage is not a problem in the prior art FIG. 3 since it pulls the termination head 40 closer to the AWG 42. However, if the epoxy of FIG. 4 shrinks, alignment of the fiber optic bundle with the AWG will suffer, as the termination block 140 is pulled toward the base 110.

An epoxy having a silicate content of over 70% by volume has been found to reduce shrinkage. Additionally, the high silicate content makes the epoxy very viscous allowing for manual alignment being maintained after being achieved. Thus, alignment of the termination head 140 and the AWG 142 can be achieved without significant post-bond shrinkage as the epoxy is cured by heat or other methods.

Raising the silicate content of the epoxy to up to 90% by volume reduces the post-bond shrinkage even more. However, as the silicate content is increased, the sheer strength of the bond is reduced, so a balancing between post-bond shrinkage and sheer strength should be performed.

The alignment method using the high viscosity epoxy described provides a robust bond area for achieving and maintaining alignment between the fiber optic bundle and the AWG. Additionally, a gel having a refractive index matching the optical fibers and the AWG channels may be dispensed between the fiber optic bundle and the AWG. This helps to prevent light from scattering at an air gap between the fiber optic bundle and the AWG.

Figure 5A:
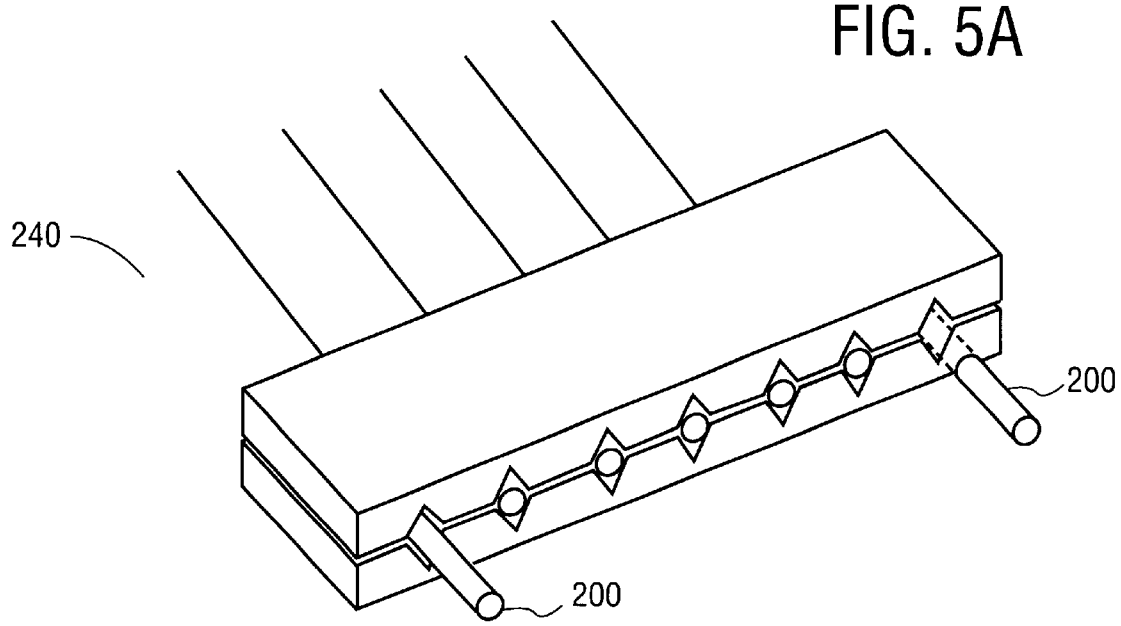
FIG. 5A shows a second embodiment for aligning a fiber optic bundle with an AWG using pins (or dowels/rods).

FIG. 5A shows a second embodiment for aligning a fiber optic bundle with an AWG using pins (or dowels/rods). In one embodiment, the termination head is made with optical fibers filling all of the grooves except for a groove at each end. The ends of the optical fibers are then polished, as usual. Pins 200 can then be inserted into the open grooves in the termination block of the fiber optic bundle.

Figure 5B:
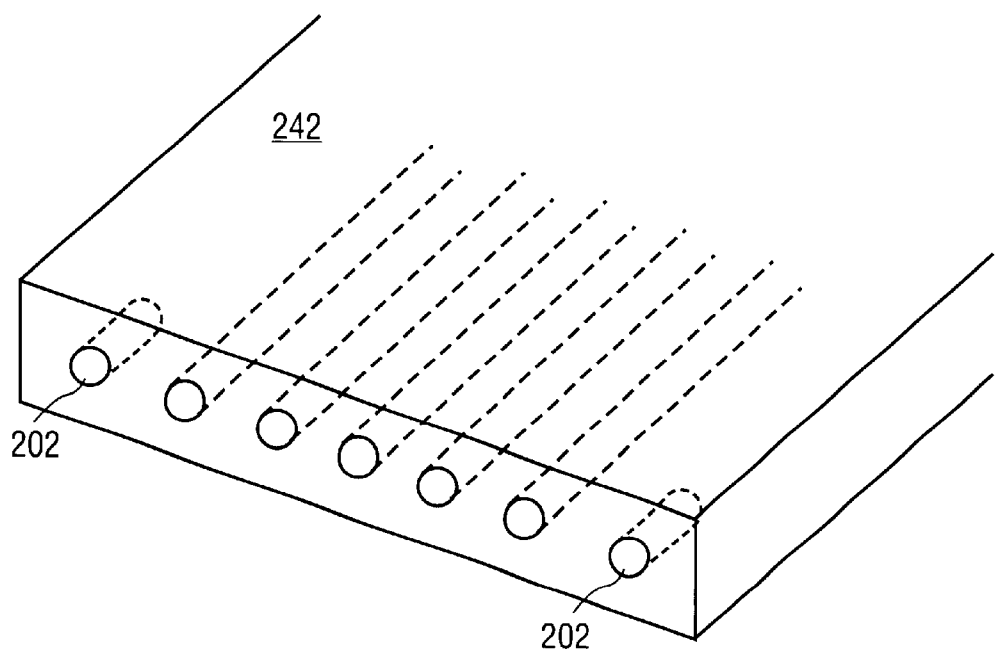
FIG. 5B shows an AWG corresponding to the fiber optic bundle of FIG. 5A.

FIG. 5B shows an AWG corresponding to the fiber optic bundle of FIG. 5A. The AWG has recesses 202. In one embodiment, the AWG recesses are initially filled with materials different from the rest of the AWG. This allows selective etching to form the recesses 202. However, other methods of making the recesses are possible.

The pins 200 of the fiber optic bundle fit snugly into the recesses 202 of the AWG to provide course alignment. Additional manual adjustment to more finely align the fiber optic bundle to the AWG may be performed.

Figure 6:
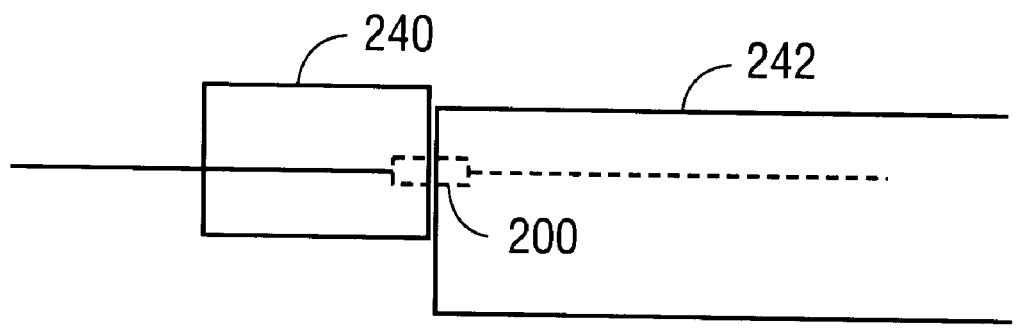
FIG. 6 shows a cross section of a fiber optic block and an AWG joined with pins 200 to perform a course alignment.

FIG. 6 shows a cross section of a fiber optic block and an AWG joined with pins 200 to perform a course alignment. A gel can be dispensed between the fiber optic bundle and the AWG to provide better photonic coupling, and an epoxy is used to permanently fix the alignment.

Figure 7:
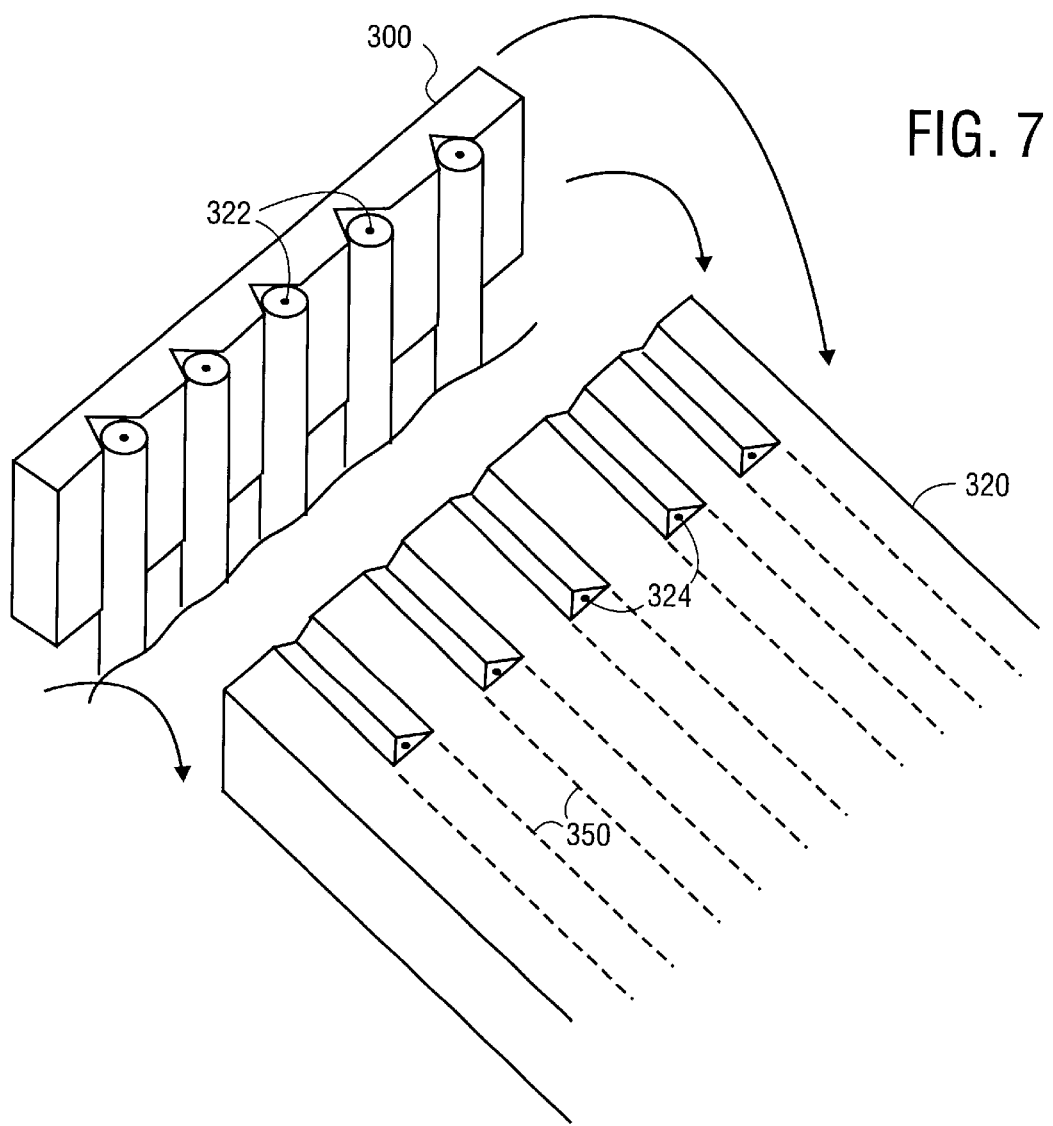
FIG. 7 shows a third embodiment for aligning optical fibers to an AWG.

FIG. 7 shows a third embodiment for aligning optical fibers to an AWG. In this embodiment only one retainer 300 is used in the termination block of the fiber optic bundle, and the optical fibers are attached into the one retainer 300. V-grooves are etched into the AWG's substrate in the same way that the retainer was etched, however the V-grooves on the AWG extend only a predetermined distance across the AWG from an edge of the AWG.

The one retainer 300 is placed over the V-grooves on the AWG 320 to sandwich the optical fibers between the retainer 300 and the AWG 320. The optical fibers come to rest within the V-grooves of the AWG 320. The ends of the optical fibers 322 are butted up against the ends of the AWG's V-grooves 324.

The interlocking compatibility between the retainer 300 and the V-grooves of the AWG 320 provide for quick course alignment of the optical fibers with the channels 350 of the AWG. Manual adjustment may then be performed to more finely align the optical fibers with the AWG.

Figure 8:
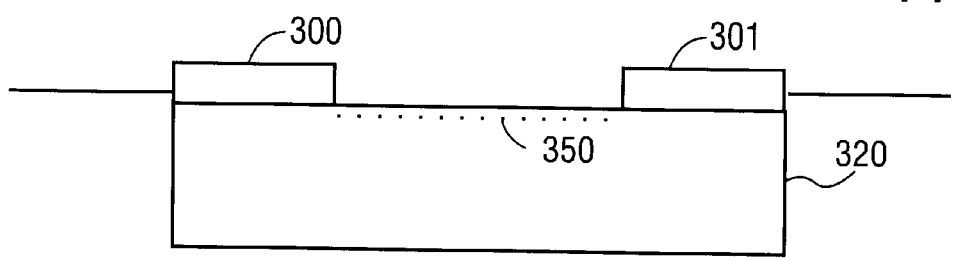
FIG. 8 shows a side view of the retainer placed over the etched AWG having channels within.

FIG. 8 shows a side view of the retainer 300 placed over the etched AWG 320 having channels 350 within. The AWG 320 may further include second set of grooves in the substrate extending from an opposite edge of the substrate partially across the substrate. A second retainer 301 may be used to attach a second set of two or more optical fibers into the second set of grooves.

Figure 9:
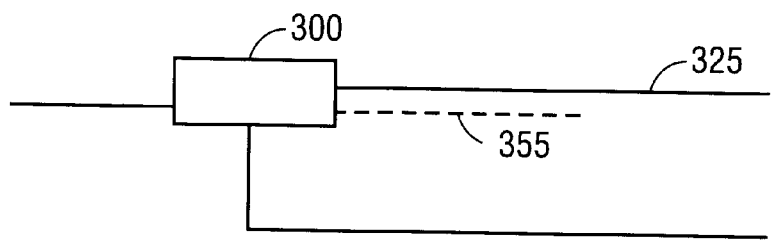
FIG. 9 shows another embodiment in which the AWG is etched a predetermined depth below the AWG surface before etching the V-grooves.

FIG. 9 shows another embodiment in which the AWG 325 is etched a predetermined depth below the AWG surface before etching the V-grooves. This allows a better coupling to channels 355 that are deeper below the AWG surface.

In one embodiment, over-etching the AWG provides for a better ability to manually align the optical fibers and the AWG afterwards. As previously described, gel or epoxy having a refractive index matching the optical fibers and the channels of the AWG can be dispensed between the retainer and AWG.

Thus, a device and method of aligning optical fibers in a fiber optic bundle to a waveguide is disclosed. However, the specific embodiments and methods described herein are merely illustrative. Numerous modifications in form and detail may be made without departing from the scope of the invention as claimed below. Rather, the invention is limited only by the scope of the appended claims.

What is claimed is:

1. A method of aligning two or more optical fibers to an array waveguide comprising:
   etching grooves into the array waveguide;
   placing the two or more optical fibers into the grooves, wherein the two or more optical fibers are attached together; and
   applying a gel having a reflective index substantially matching that of the optical fibers between the optical fibers and the array waveguide.

2. The method of claim 1, wherein the two or more optical fibers are held together in a retainer that has etched grooves in it.

3. The method of claim 1, wherein the etching is done directly over channels within the array waveguide.

4. The method of claim 3 wherein
   applying the gel to the grooves of the array waveguide improves the coupling of the two or more optical fibers to the channels of the array waveguide.

5. The method of claim 4 further comprising:
   manually adjusting the two or more optical fibers to improve an optical connection between the two or more optical fibers and the array waveguide.

6. A method of aligning two or more optical fibers to channels in a substrate comprising:
   etching grooves in the substrate;
   placing the two or more optical fibers into the grooves in the substrate, wherein the two or more optical fibers are attached by a retainer that maintains the two or more optical fibers at a predetermined distance away from one another; and
   applying a gel having a reflective index substantially matching that of the optical fibers between the optical fibers and the retainer.

7. The method of claim 6 wherein the etching is done directly over the channels in the substrate.

8. The method of claim 7 wherein the etching is performed at one edge of the substrate and extends only partially across the substrate.

9. The method of claim 8 further comprising:
   etching a second set of grooves in the substrate extending from an opposite edge of the substrate partially across the substrate.

10. The method of claim 9 further comprising:
    placing a second set of two or more optical fibers into the second set of grooves, wherein the second set of the two or more optical fibers are attached by a second retainer that maintains a spacing between the second set of the two more optical fibers.

11. A device comprising:
    an array waveguide having channels running internally, the array waveguide having V-grooves etched into an edge of the array waveguide;
    a plurality of optical fibers placed within the V-grooves of the array waveguide;
    a retainer sandwiching the plurality of optical fibers between itself and the array waveguide, the retainer having V-grooves mirroring the V-grooves of the array waveguide; and
    a gel having a reflective index substantially matching that of the plurality of optical fibers placed between the plurality of optical fibers and the array waveguide.

12. The device of claim 11, wherein the array waveguide has a second set of V-grooves etched into an opposite edge of the array waveguide, and the device further comprises:
    a second plurality of optical fibers placed within the second set of V-grooves of the array waveguide; and
    a second retainer sandwiching the second plurality of optical fibers between itself and the array waveguide, the second retainer having V-grooves mirroring the second set of V-grooves of the array waveguide.

13. The device of claim 12 further comprising:
    a gel placed between the second plurality of optical fibers and the array waveguide, wherein the gel has a refractive index substantially matching that of the second plurality of optical fibers.

14. The device of claim 11, wherein the V-grooves are etched directly over the channels within the array waveguide.

15. The device of claim 11, wherein the gel improves the coupling of the optical fibers to the channels of the array waveguide.

16. The device of claim 11, wherein the optical fibers are manually adjusted to improve an optical connection between the optical fibers and the array waveguide.

17. The device of claim 11, further comprising:
an epoxy to permanently fix the alignment between the array waveguide and the retainer.

18. The device of claim 11, wherein the epoxy has a silicate content over 70% by volume.

19. The device of claim 11, wherein the array waveguide is etched a predetermined depth below a surface.

* * * * *